US012009169B2

(12) United States Patent
Suutarinen et al.

(10) Patent No.: US 12,009,169 B2
(45) Date of Patent: Jun. 11, 2024

(54) UTILIZATION UNIT OF AN ELECTRIC SWITCH

(71) Applicant: ABB Schweiz AG, Baden (CH)

(72) Inventors: Aki Suutarinen, Vaasa (FI); Matti Rajala, Vaasa (FI); Raimo Sillanpää, Vaasa (FI); Juri Fredlund, Vaasa (FI); Markus Lönn, Vaasa (FI); Marko Pylkäs, Vaasa (FI); Tero Kentala, Vaasa (FI)

(73) Assignee: ABB Schweiz AG, Baden (CH)

( * ) Notice: Subject to any disclaimer, the term of this patent is extended or adjusted under 35 U.S.C. 154(b) by 665 days.

(21) Appl. No.: 16/820,095

(22) Filed: Mar. 16, 2020

(65) Prior Publication Data

US 2020/0219690 A1 Jul. 9, 2020

Related U.S. Application Data

(63) Continuation of application No. PCT/FI2018/050660, filed on Sep. 13, 2018.

(30) Foreign Application Priority Data

Sep. 15, 2017 (FI) .................................. U20174211

(51) Int. Cl.
*H01H 50/22* (2006.01)
*H01H 47/22* (2006.01)
(Continued)

(52) U.S. Cl.
CPC .......... *H01H 50/021* (2013.01); *H01H 47/22* (2013.01); *H01H 50/14* (2013.01)

(58) Field of Classification Search
CPC ...... H01H 50/021; H01H 47/22; H01H 50/14; H01H 71/0271; H01H 71/1009;
(Continued)

(56) References Cited

U.S. PATENT DOCUMENTS

| | | | | |
|---|---|---|---|---|
| 3,636,410 A * | 1/1972 | Pardini | .................. | H01H 71/40 361/115 |
| 4,194,182 A * | 3/1980 | Martin | ............. | H02J 13/00009 340/309.9 |

(Continued)

FOREIGN PATENT DOCUMENTS

| | | |
|---|---|---|
| CN | 203659676 U | 6/2014 |
| EP | 2690643 A1 | 1/2014 |

(Continued)

OTHER PUBLICATIONS

European Patent Office, Extended Search Report issued in corresponding Application No. 18856005.6, dated Sep. 24, 2020, 12 pp.

(Continued)

*Primary Examiner* — Shawki S Ismail
*Assistant Examiner* — Lisa N Homza
(74) *Attorney, Agent, or Firm* — Leydig, Voit & Mayer, Ltd.

(57) ABSTRACT

A utilization unit of an electric switch includes an actuator module which includes actuators and power transmission apparatus to operate the electric switch, a power module which includes power supply means for the actuators of the actuator module, a control module which includes control means to control the power module, and data transmission means. The actuator module, the power module, and the control module constitute a modular structure, wherein the power module and the control module are detachably connected to each other and the actuator module so that the power module and the control module are both separately replaceable in the utilization unit.

3 Claims, 12 Drawing Sheets

(51) Int. Cl.
*H01H 50/02* (2006.01)
*H01H 50/14* (2006.01)

(58) Field of Classification Search
CPC .......... H01H 19/64; H01H 19/46; H01H 3/42; H01H 9/26
USPC .......................................................... 361/142
See application file for complete search history.

(56) References Cited

U.S. PATENT DOCUMENTS

| | | | | | |
|---|---|---|---|---|---|
| D658,136 | S * | 4/2012 | Weber | D13/160 | |
| D687,386 | S * | 8/2013 | Uitto | D13/158 | |
| D697,873 | S * | 1/2014 | Uitto | D13/158 | |
| D749,048 | S * | 2/2016 | Zheng | D13/169 | |
| D750,576 | S * | 3/2016 | Zheng | D13/169 | |
| D784,268 | S * | 4/2017 | Rajala | D13/158 | |
| D845,908 | S * | 4/2019 | Jokiniemi | D13/158 | |
| D881,138 | S * | 4/2020 | Jokiniemi | D13/158 | |
| D883,938 | S * | 5/2020 | Jokiniemi | D13/158 | |
| 2007/0063796 | A1* | 3/2007 | Mattlar | H01H 71/1027 | 335/6 |
| 2011/0308928 | A1 | 12/2011 | Eisner | | |
| 2012/0026640 | A1 | 2/2012 | Doellerer et al. | | |
| 2015/0055305 | A1 | 2/2015 | Mackey et al. | | |
| 2015/0287551 | A1* | 10/2015 | Uitto | H01H 1/2041 | 200/243 |
| 2015/0318133 | A1* | 11/2015 | Lauraire | H01H 50/14 | 335/185 |
| 2015/0325397 | A1* | 11/2015 | Larcher | H01H 71/0228 | 335/187 |
| 2015/0333423 | A1 | 11/2015 | Busch et al. | | |

FOREIGN PATENT DOCUMENTS

| | | | |
|---|---|---|---|
| WO | 2005069324 | A1 | 7/2005 |
| WO | 2016165054 | A1 | 10/2016 |

OTHER PUBLICATIONS

Finnish Patent Office, International Search Report & Written Opinion issued in corresponding Application No. PCT/FI2018/050660, dated Dec. 19, 2018, 25 pp.

* cited by examiner

UTILIZATION UNIT OF AN ELECTRIC SWITCH

FIELD OF TECHNOLOGY

The invention relates to a utilization unit of an electric switch.

PRIOR ART

Electric switches of various kind are on the market, having fixed contacts and moving contacts. Moving contacts form connections between fixed contacts. An electric switch may comprise two or three fixed contacts and one moving contact that carries out connections between fixed contacts. A throw-over switch may comprise three fixed contacts and a rotating blade contact by means of which three contact states may be formed. In a zero state, all three fixed contacts are electrically isolated from each other. In a first connecting state, the blade contact forms a connection between the first fixed contact and the third fixed contact. In a second connecting state, the blade contact forms a connection between the second contact and the third fixed contact. Throw-over switches may be used in a situation where it is necessary to connect a load to a primary power source or a secondary power source. Such a need exists in hospitals, for example, where the primary power source is the electric network and the secondary power source is an emergency power station. So, the load is connected to the third fixed contact and the primary power source to the first or second fixed contact, and correspondingly the secondary power source to the second or first fixed contact.

Electric switches may be directly controlled manually, or manually through an actuator, or automatically by a utilization unit. A utilization unit may comprise a solenoid and springs, by means of which the moving blade contact of an electric switch is moved.

SUMMARY

The object of the invention is an improved utilization unit of an electric switch.

The inventive utilization unit of an electric switch is defined in claim 1.

The utilization unit of an electric switch comprises:

- an actuator module which includes actuators and a power transmission apparatus to operate the electric switch,
- a power module including power supply means to the actuators of the actuator module,
- a control module including control means to control the power module, and data transfer means.

The utilization unit is characterised in that

- the actuator module, the power module, and the control module constitute a modular structure, whereby the power module and the control module are detachably connected to each other and the actuator module so that the power module and the control module are both separately replaceable in the utilization unit.

Throw-over switches are often used in places where the need exists to connect a load to a primary power source or a secondary power source. Such a need exists in hospitals, for example, where the primary power source is the electrical network and the secondary power source is an emergency power station. So, the load is connected to the third fixed contact and the primary power source to the first or second fixed contact, and correspondingly the secondary power source to the second or first fixed contact.

In such places, it is important that maintenance and repair breaks of the throw-over switch and the associated utilization unit are kept as short as possible. The utilization unit of a throw-over switch contains a lot of electronics, whereby a malfunction of one electronic component causes the throw-over switch to become inoperative. In the worst case, this may result in a long interruption of power supply.

The utilization unit of the invention consists of an actuator module, a power module, and a control module, whereby the power module and the control module are both separately replaceable in the utilization unit. A faulty power unit or control unit in the utilization unit may be replaced quickly, which minimizes the downtime.

FIGURES

Next, the invention will be explained with reference to the accompanying drawings, in which.

Figure 7:
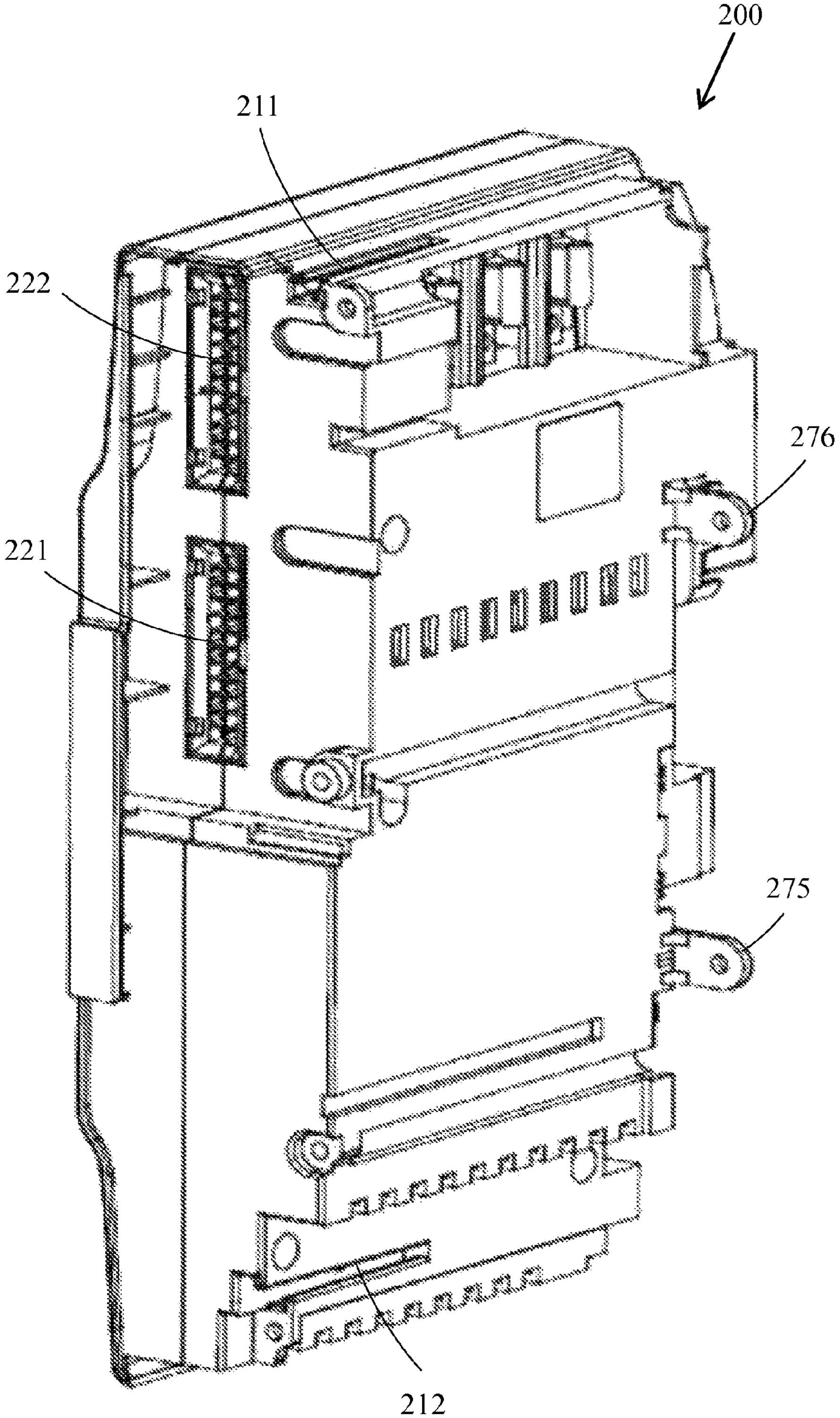
Figure 8:
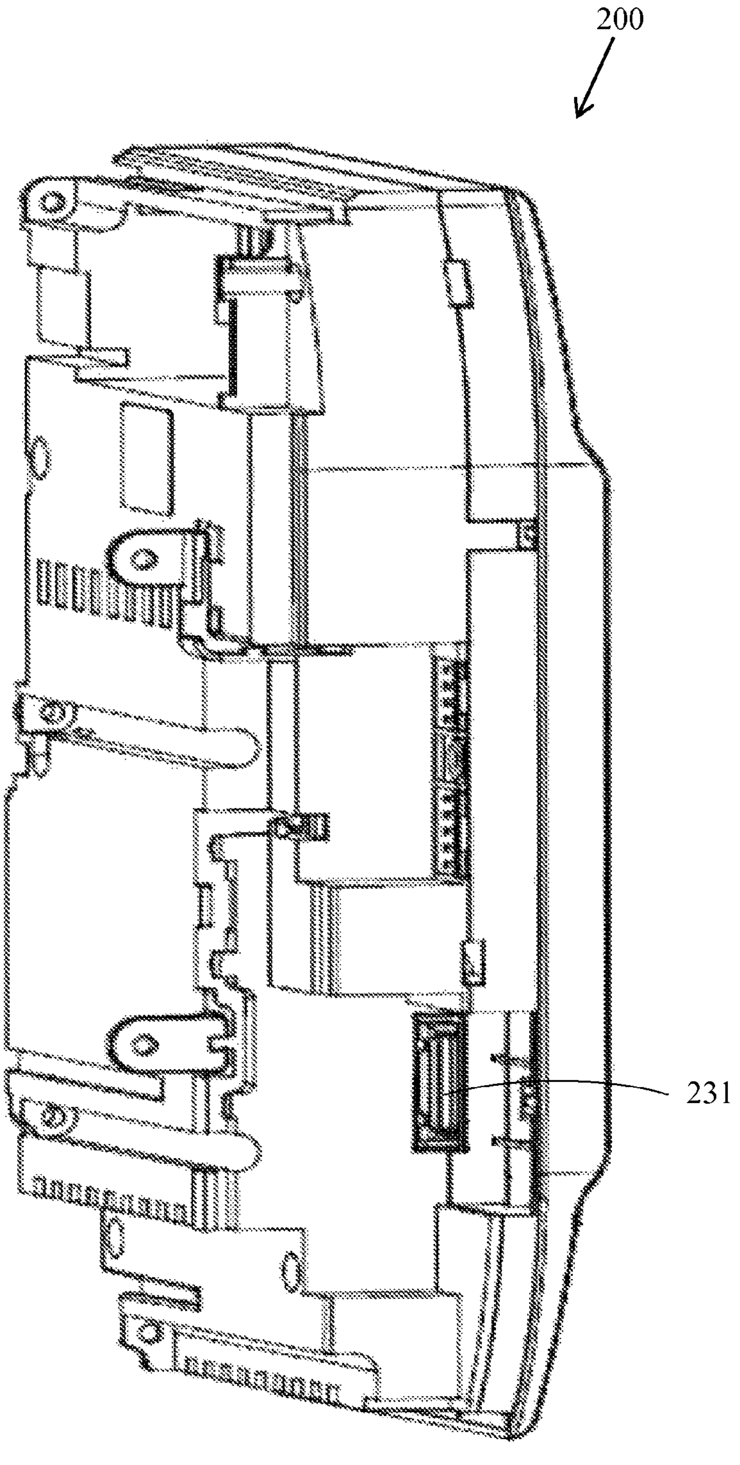
Figure 9:
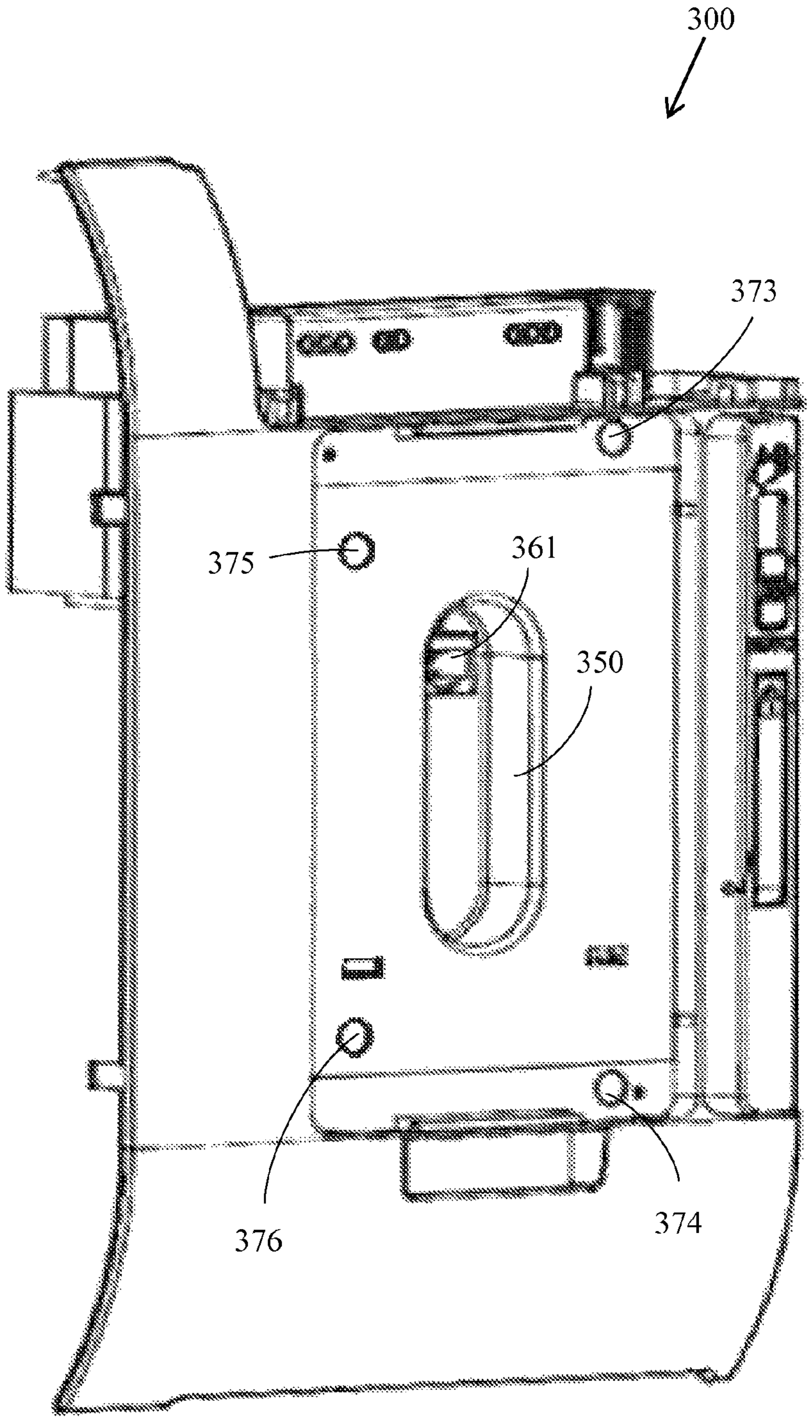
Figure 10:
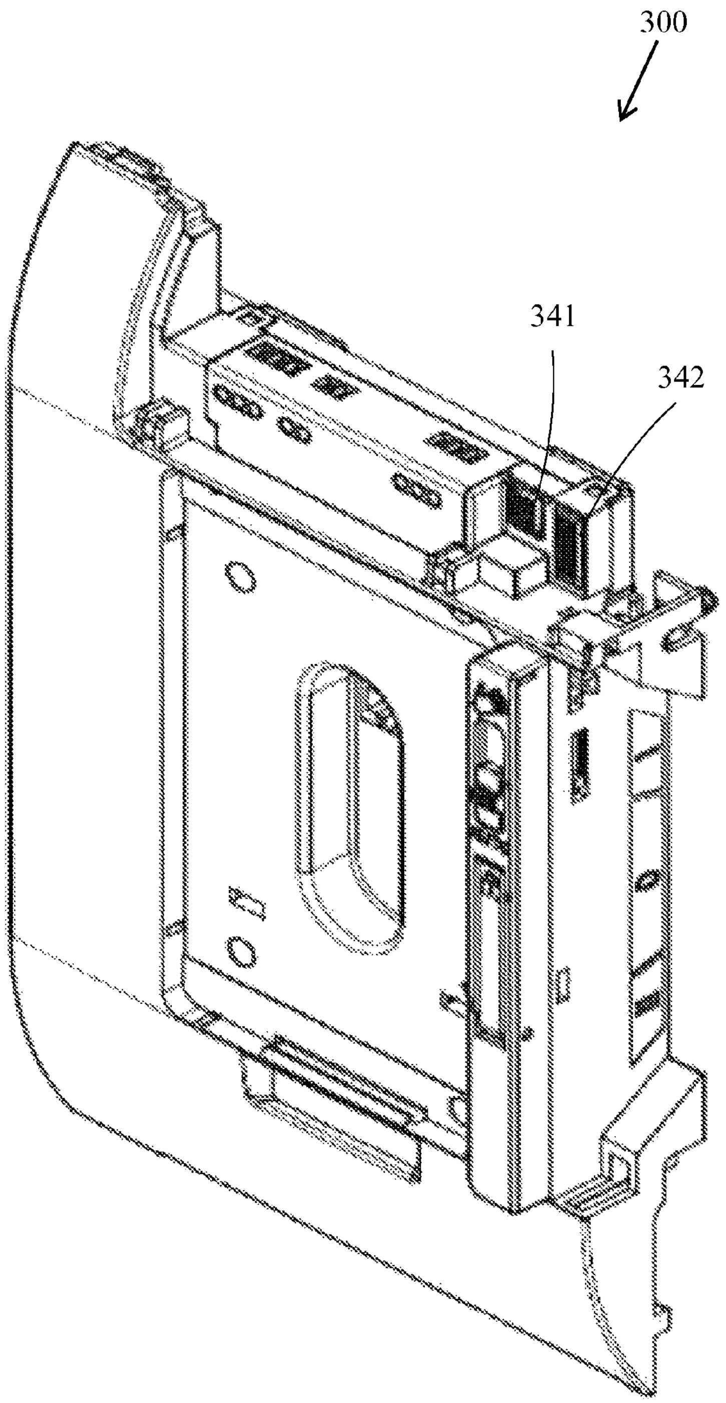
Figure 11:
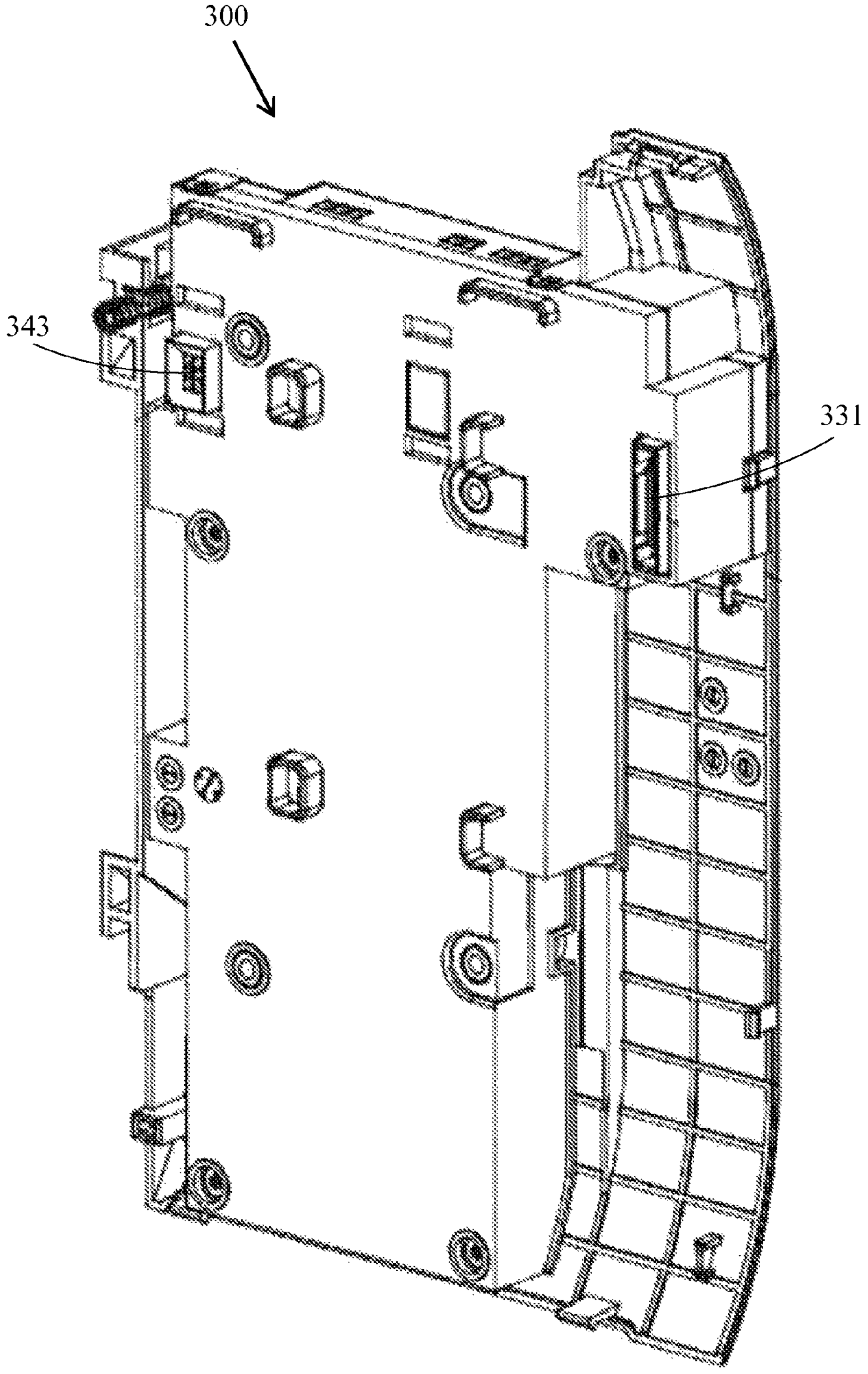
Figure 12:
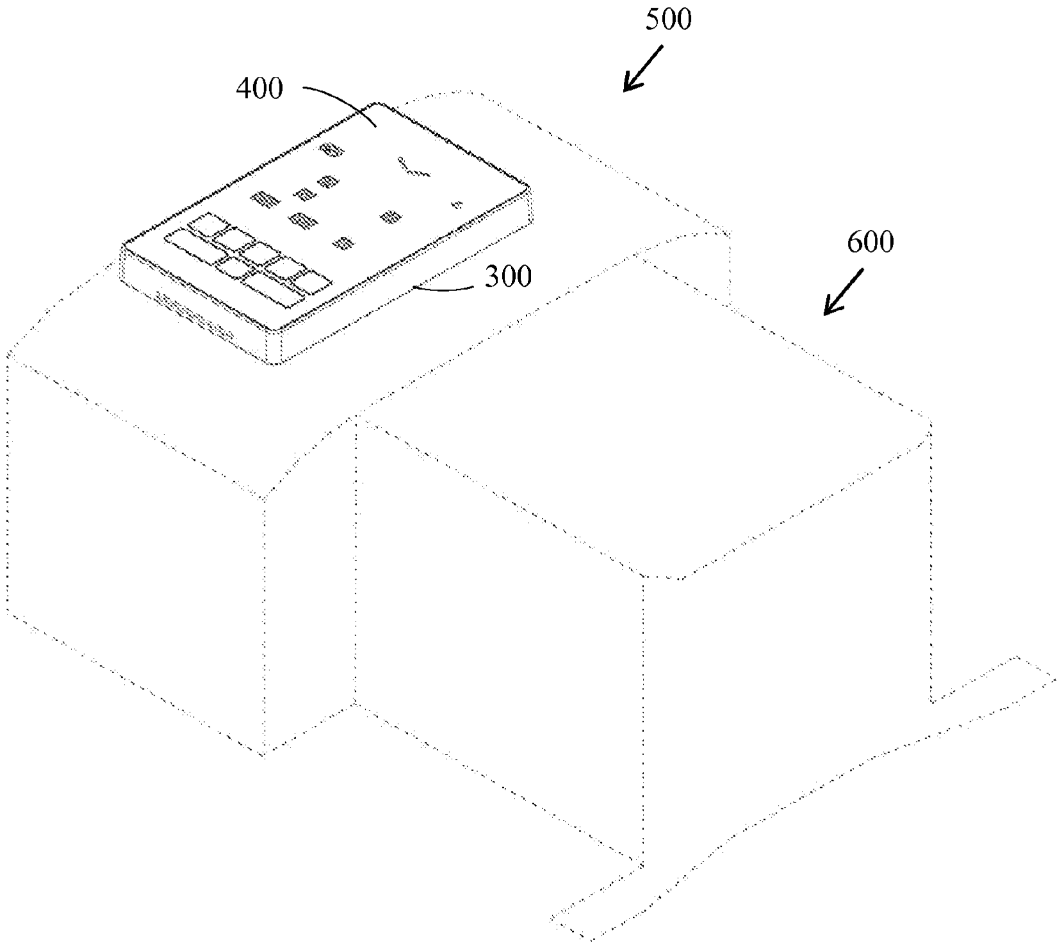

FIG. 7 is a rear view from a first direction of a power module of the utilization unit, FIG. 8 is a rear view from a second, opposite direction of a power module of the utilization unit, FIG. 9 is a front view from a first direction of a control module of the utilization unit, FIG. 10 is a front view from a second, opposite direction of a control module of the utilization unit, FIG. 11 is a rear view of a control module of the utilization unit, FIG. 12 shows a user interface module.

DETAILED DESCRIPTION

Figure 1:
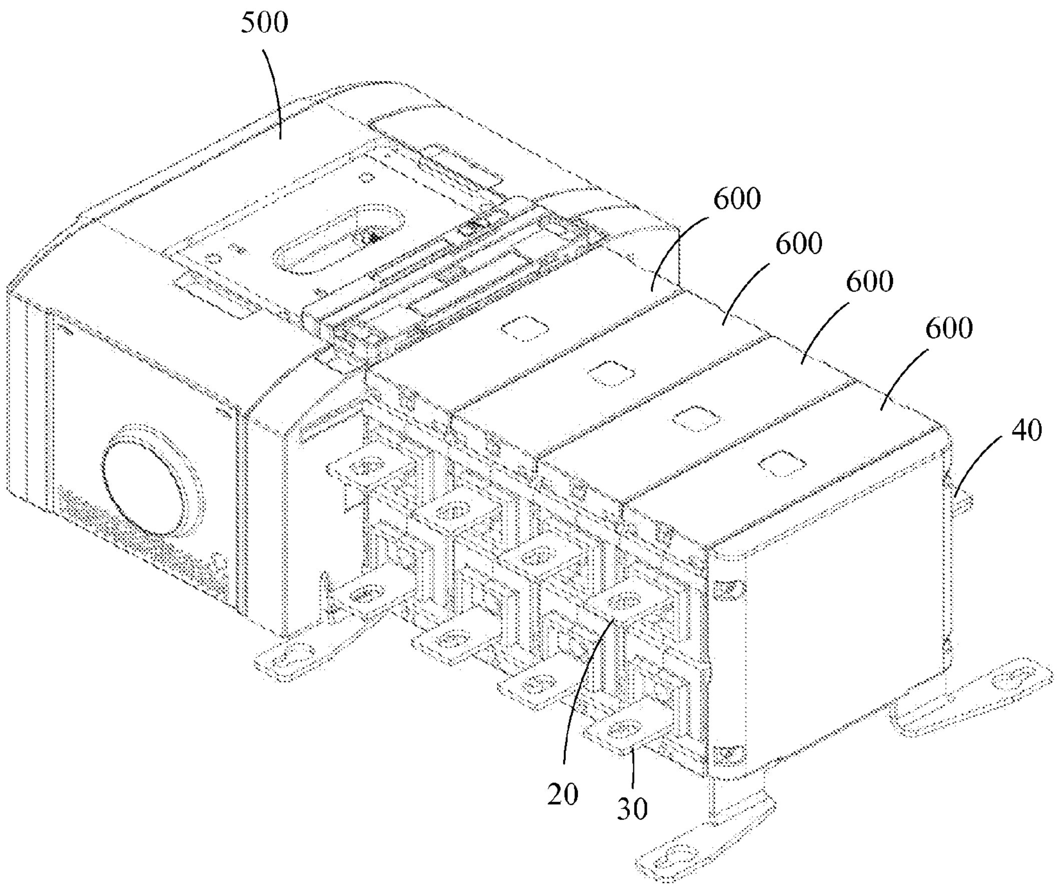
FIG. 1 shows electric switches and their utilization unit.

FIG. 1 shows electric switches and their utilization unit.

The figure shows four adjacent inter-connected modular electric switches 600 and their utilization unit 500. The electric switches 600 are connected to each other so that the moving contact of each electric switch 600 connects to the utilization unit 500. Thus, the utilization unit 500 controls the moving contact of each electric switch. The figure shows the first, second, and third fixed contact 20, 30, 40 of the electric switch 600.

Figure 2:
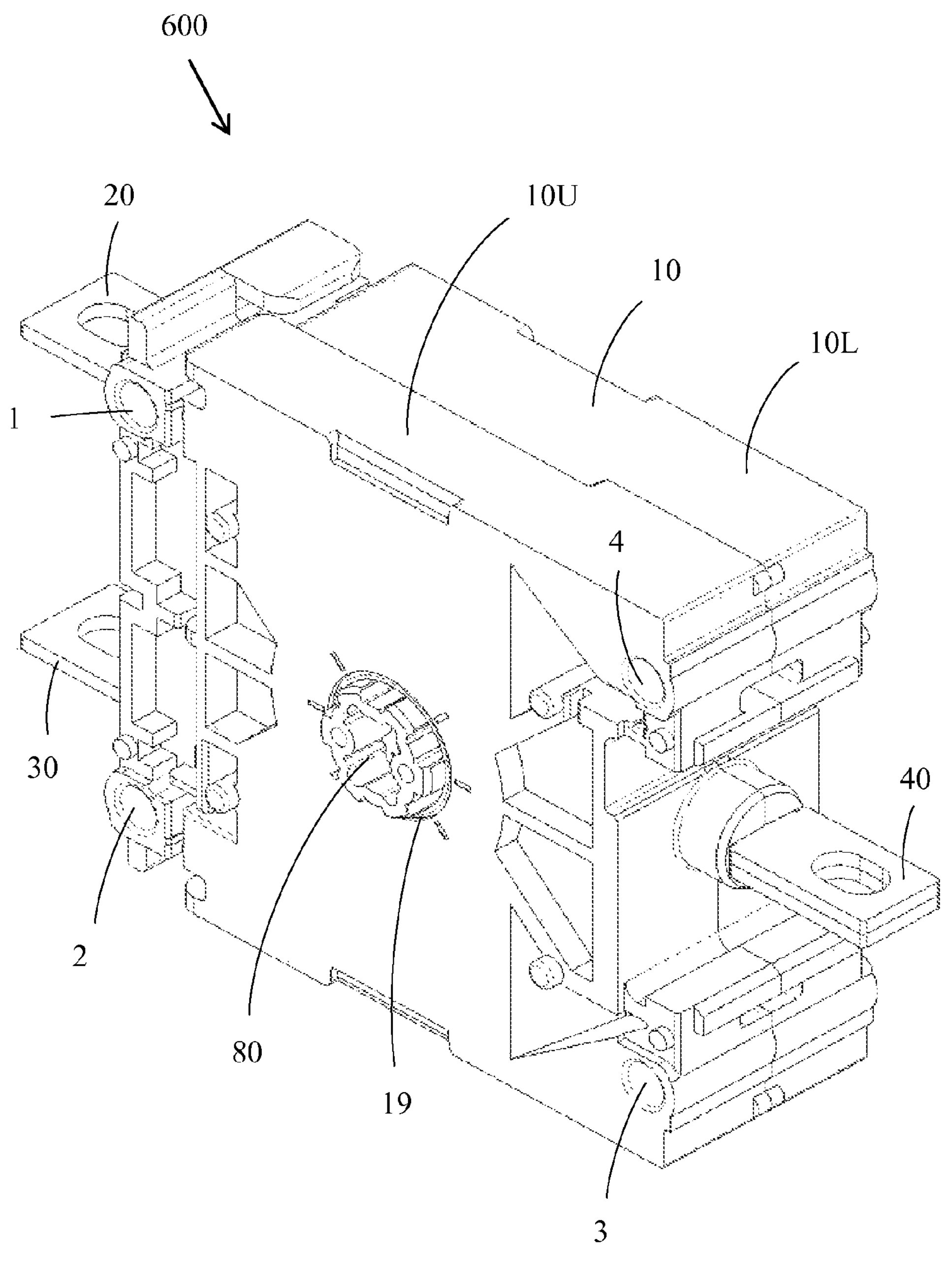
FIG. 2 shows an electric switch.

FIG. 2 shows an electric switch.

The electric switch 600 comprises an enclosure 10 which consists of two halves 10L and 10U. The first half 10L of the enclosure 10 sets against the second half 10U of the enclosure so that inside the halves 10L, 10U a substantially closed space is formed. On both halves 10L, 10U of the enclosure 10 there are fastening openings 1, 2, 3, 4 extending through the enclosure 10. The halves 10L, 10U of the enclosure 10 may be fastened to each other by the use of bolts and nuts extending through the fastening openings 1, 2, 3, 4.

In the enclosure 10 have been adapted a first fixed contact 20, a second fixed contact 30, and a third fixed contact 40, each of which may be connected to a circuit which is external in relation to the enclosure 10. In addition, a rotating blade contact 50, located entirely within the enclosure 10, has been adapted in the enclosure 10, The rotating blade contact 50 is supported to a roll 80, the roll 80 being supported rotatably by its ends to round openings 19 on the side planes of the enclosure 10. The rotating blade contact 50 is shown in FIG. 3.

Figure 3:
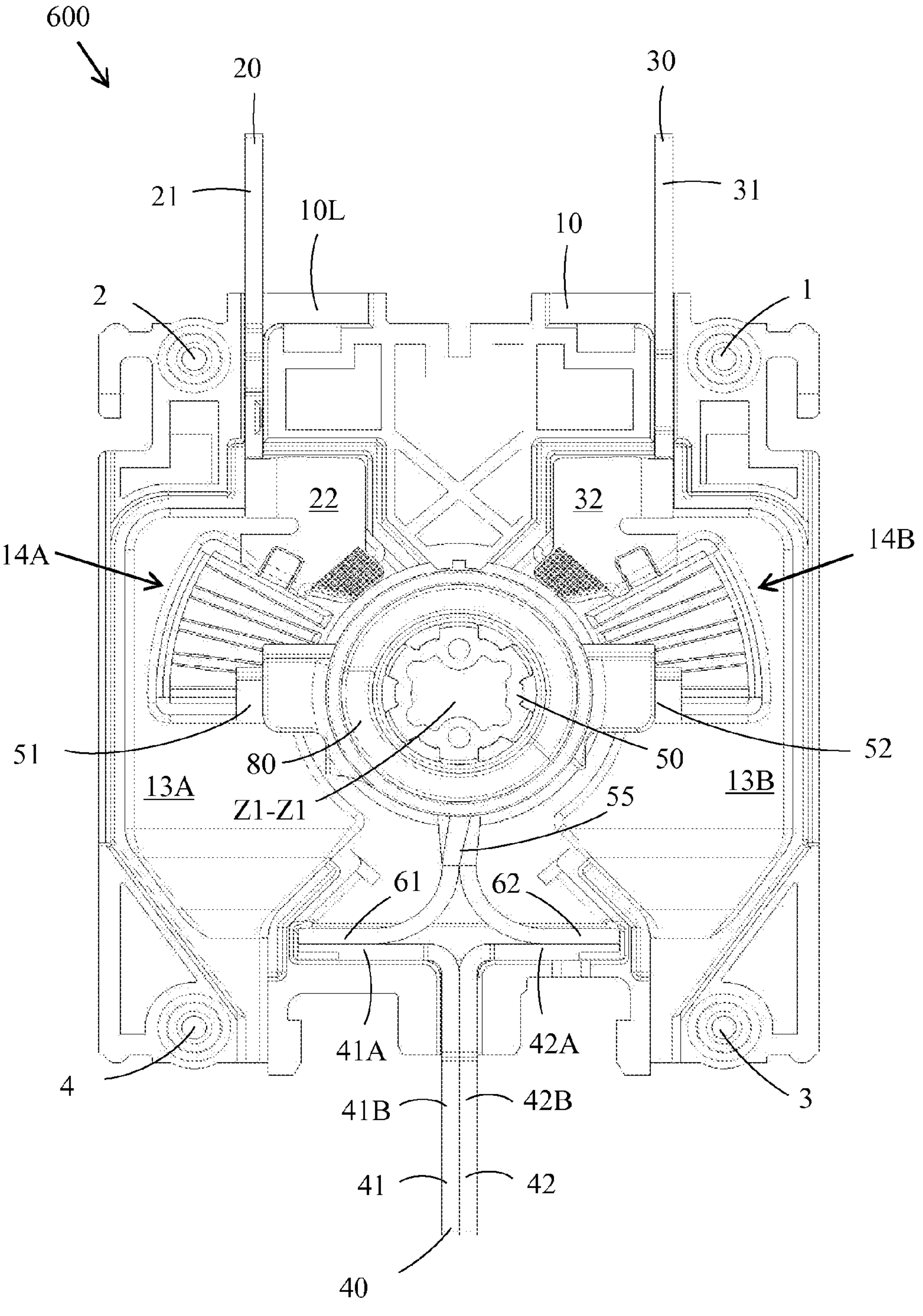
FIG. 3 shows an electric switch open.

FIG. 3 shows an electric switch open.

The cross section of the first half 10L of the enclosure 10 reveals the first fixed contact 20, the second fixed contact 30, and the third fixed contact 40, and the rotating blade contact 50. The inside space of the enclosure 10 is divided into two chambers 13A, 13B, both having an extinguishing apparatus 14A, 14B for electric arcs.

The first fixed contact 20 comprises a connection portion 21 extending outside of the enclosure 10, and a coupling portion 22 inside the enclosure 10 in the first chamber 13A. In a similar manner, the second fixed contact 30 comprises a connection portion 31 extending outside of the enclosure 10, and a coupling portion 32 inside the enclosure 10 in the second chamber 13B.

In this embodiment, the third fixed contact 40 is formed of two L-shaped parts 41, 42 whose horizontal claws 41A, 42A set against support surfaces inside the enclosure 10 and vertical claws 41B, 42B extend outside the enclosure 10. The horizontal claw 41A, 42A of each L-shaped part 41, 42 of the third fixed contact 40 are electrically connected by at least one braided wire 61, 62 to a centre portion 55 of the rotating blade contact 50. The third fixed contact 40 may also consist of one L-shaped part.

The blade contact 50, which rotates in relation to the enclosure 10 about the rotating axis Z1-Z1, comprises at least one pair of blades. The rotating blade contact 50 is in the figure shown in the zero position, wherein the first, second, and third fixed contact 20, 30, 40 are electrically isolated from each other. The rotating blade contact 50 is adapted in the first roll 80 so that the opposite ends 51, 52 of the rotating blade contact 50, which at the same time are the opposite ends of the pair of blades, protrude from the roll 80 and move in connecting situations through the extinguishing apparatus 14A, 14B of electric arcs in each chamber 13A, 13B.

The rotating blade contact 400 may be turned clockwise to a first connecting position whereby the first end 51 of the blade contact 50 moves through the first extinguishing apparatus 13A of electric arcs, and connects to the coupling portion 22 of the first fixed contact 20. In such a case, the first fixed contact 20 connects, through the blade contact 50, electrically to the third fixed contact 40.

On the other hand, the rotating blade contact 400 may be turned counterclockwise to a second connecting position whereby the second end 52 of the blade contact 50 moves through the second extinguishing apparatus 13B of electric arcs, and connects to the coupling portion 32 of the second fixed contact 30. In such a case, the second fixed contact 30 connects, through the blade contact 50, electrically to the third fixed contact 40.

As shown in FIG. 1, a plurality of electric switches 600 may be placed in parallel as an electric switch pack, whereby a multi-stage electric switch may be formed. The electric switches 600 may connect to each other by means of the roll 80 of the rotating blade contact 50. The first end of the roll 80 may extend out from a side plane of the enclosure 10 and the second, opposite end of the roll 80 may stay substantially at the level of the side surface of the enclosure 10. The first end of the roll 80 may comprise a cylindrical outer end on the outer circumference of which a first gearing is formed. The second end of the roll 80 may correspondingly comprise a cylindrical recess, on the outer circumference of which recess a second gearing is formed. When two adjacent electric switches 600 are connected together, the first protruding end of the roll 80 of the first electric switch 600 sets into the recess of the second end of the roll 80 of the second electric switch 600 so that the gearings are inter-coupled. The rolls 80 of both electric switches 600 may thus be coupled to each other so that they rotate in a synchronized manner.

Figure 4:
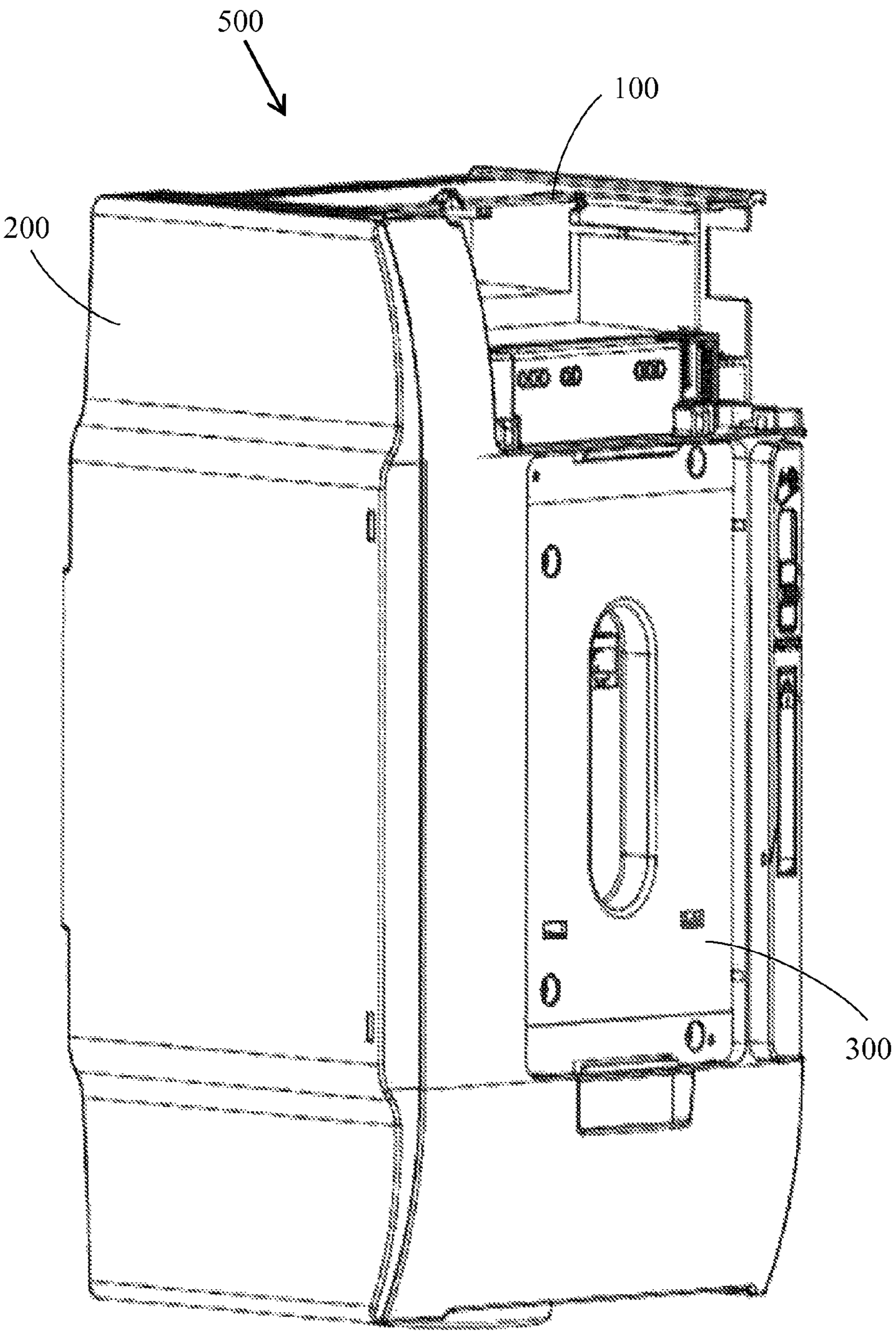
FIG. 4 shows a utilization unit of an electric switch.

FIG. 4 shows a utilization unit of an electric switch,

The utilization unit 500 comprises an actuator module 100, power module 200, and control module 300. The power module 200 and control module 300 are detachably fixed to the actuator module 100.

Figure 5:
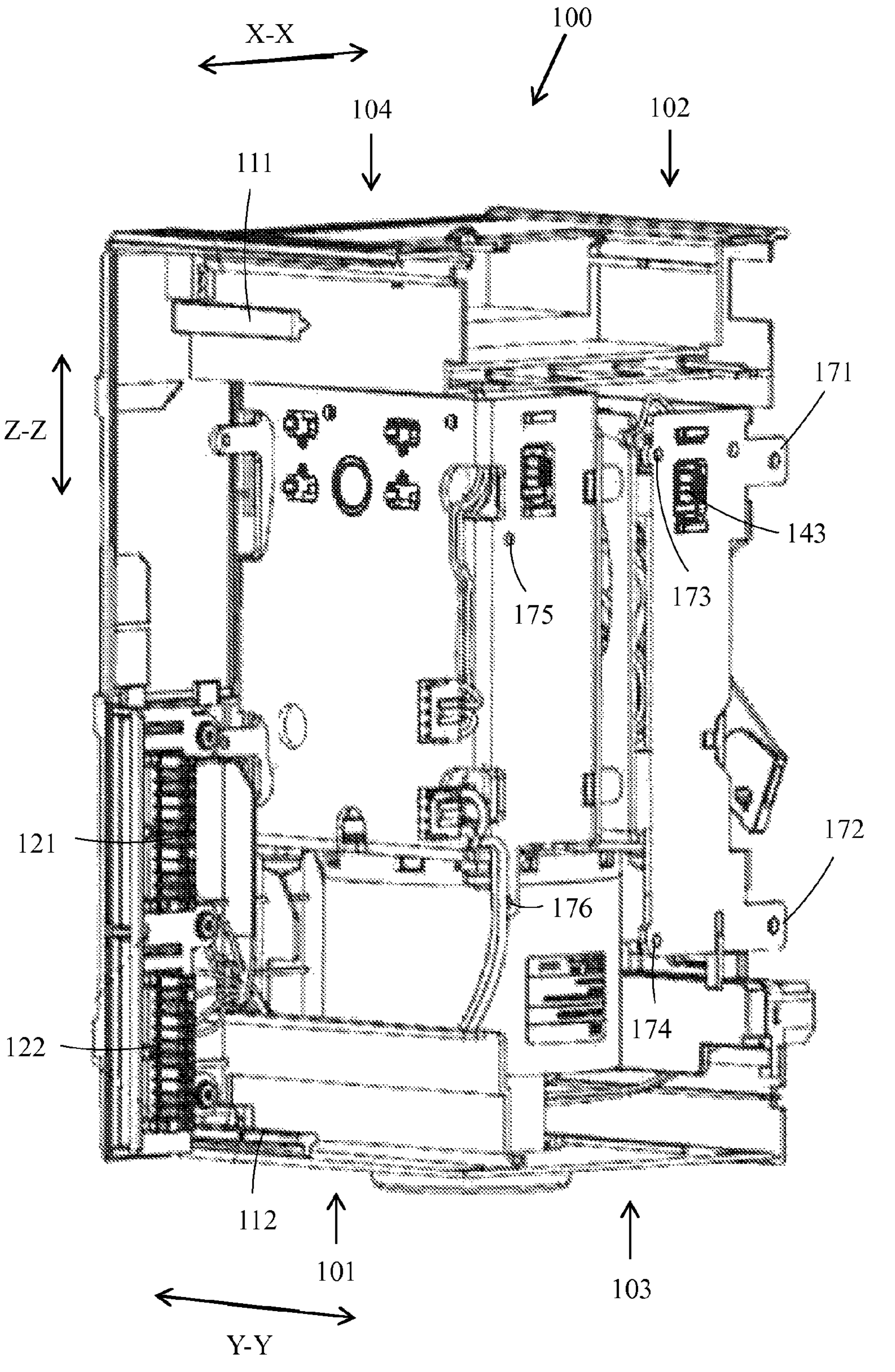
FIG. 5 shows an actuator module of a utilization unit.

FIG. 5 shows an actuator module of a utilization unit.

The actuator module 100 comprises a substantially parallelepiped frame having a width direction X-X, height direction Y-Y, and depth direction Y-Y. The frame comprises a first side wall 101, second side wall 102, front wall 103, and rear wall 104. The first and second side walls 101, 102 are opposite each other, at a distance from each other in the width direction X-X of the actuator module 100. The front wall 103 and the rear wall 104 are also opposite each other, at a distance from each other in the depth direction X-X of the actuator module 100. The rear wall 101 extends outside the first side wall 101.

The actuator module 100 and power module 200 have complementary electric connectors. In the protruding portion of the rear wall 104 of the actuator module 100, the first electric connectors 121, 122 have been adapted, to which the complementary second electric connectors 221, 222 of the power module 200 connect when the power module 200 is connected to the actuator module 100. In this embodiment, the first electric connectors 121, 122 are formed of two separate electric connectors. By means of these electric connectors 121, 122, 221, 222 electric power may be transferred between the actuator module 100 and power module 200.

The actuator module 100 and control module 300 also have complementary electric connectors. On the front wall 103 of the actuator module 100 resides a third electric connector 143, to which a complementary fourth electric connector 343 of the control module 300 connects when the control module 300 is connected to the actuator module 100. The third electric connector 143 may act as a data transfer connector whereby it is possible to use it to monitor the position of the drive shaft of the actuator module 100, that is, the state of the rotating blade contact 50 of the electric switch 600. By means of the third electric switch 143, it is possible to feed a feedback information to the control module 300 on the state of the rotating blade contact 50 of the electric switch 600.

The actuator module 100 and power module 200 also have complementary mechanical guiding means. The first side wall 101 of the actuator module 100 has the first guiding means, that is, guiding rails 111, 112 which establish a form-locked joint in the complementary second guiding means of the power module 200, that is, in guiding grooves 211, 212 when the power module 200 is connected to the actuator module 100. Naturally, it would be possible to place the guiding rails 111, 112 to the power module 200 and the guiding grooves 211, 212 correspondingly to the actuator module 100. Instead of guiding rails 111, 112 and guiding grooves 211, 212 other complementary guiding means establishing a form-locked joint could also be used.

The front wall 103 of the actuator module 100 additionally has two fastening lugs 171, 172 provided with through holes. By means of these fastening lugs 171, 172, the actuator module 100 may be fastened to the pack formed out of the electric switches 600.

The front wall 103 of the actuator module 100 additionally has four holes 173, 174, 175, 176. The control module 300 correspondingly has fastening holes 373, 374, 375, 376 that align with the holes 173, 174, 175, 176 of the actuator module 100. The control module 300 may thus be fastened to the actuator module 100 by screws extending through the fastening holes 373, 374, 375, 376.

The electric switch 600 is set on the right side wall 102 of the actuator module 100. The actuator module 100 couples by means of a drive shaft to the end of the protruding roll 80 of the electric switch 600 so that the actuator module 100 may rotate the roll 80 to both directions in order to rotate the blade contact 50.

So, the drive shaft of the actuator module 100 drives the roll 80 of the electric switch 600 connected to it and consequently the rotating blade contact 50 of the electric switch 500. In a situation where a plurality of electric switches 500 form a pack, the rolls 80 of adjacent electric switches are connected to each other whereby the drive shaft of the actuator module 100 simultaneously drives the rotating blade contact 50 of all the electric switches 500.

The actuator module 100 includes the actuators and power transmission apparatus to rotate the roll 80 of the electric switch and consequently the rotating blade contact 50. The actuator module 100 may comprise a solenoid and springs. The springs may be strung with the solenoid. With strung springs, the position of the rotating blade contact 50 may be changed.

The actuator module 100 comprises a connection to the electrical network whereby electrical power feed to the power module 200 and control module 300 passes through the electric connectors 121, 122 of the actuator module 100.

Figure 6:
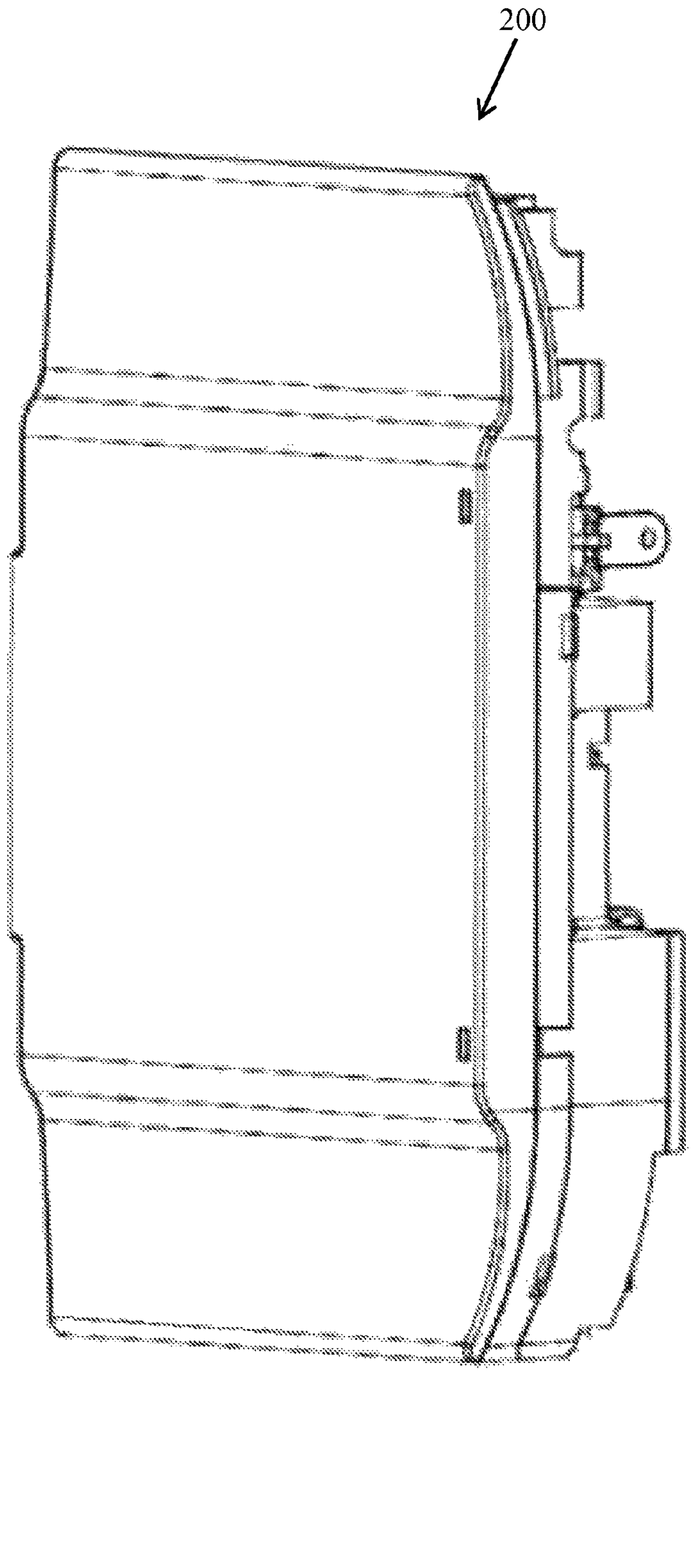
FIG. 6 is a front view of a power module of the utilization unit.

FIG. 6 is a front view of a power module of the utilization unit.

The power module 200 connects to the actuator module 100 with the left edge first.

FIG. 7 is a rear view from a first direction of a power module of the utilization unit.

The power module 200 has been turned by 180 degrees so that the lower edge points upwards and the top edge downwards.

The power module 200 has second electric connectors 221, 222 which connect to the complementary first electric connectors 121, 122 of the actuator module 100 when the power module 200 is connected to the actuator module 100. In this embodiment, the second electric connectors 221, 222 comprise two separate electric connectors.

The power module 200 also has second guiding means, that is, guiding grooves 211, 212 which receive the first complementary guiding means of the actuator module 100, that is, guiding rails 111, 112 when the power module 200 is connected to the actuator module 100.

The power module 200 additionally has two fastening lugs 275, 276 provided with through holes. The fastening openings 375, 376 of the control module 300 are set against the holes in the fastening lugs 275, 276 of the power module 200, whereby the control module 300 may be fastened by means of screws extending through fastening openings 375, 376 of the control module 300 and fastening lugs 275, 276 of the power module 200 to the actuator module 100.

FIG. 8 is a rear view from a second, opposite direction of a power module of the utilization unit.

The power module 200 has a fifth electric connector 231 which connects to a complementary sixth electric connector 331 of the control module 300 when the control module 300 is connected to the power module 200. The power module 200 may thus be controlled by the control module 300 by means of its data transfer connection.

The power module 200 includes power supply means to the actuators of the actuator module 100. The power module 200 may comprise a rectifier circuit to control the solenoid of the actuator module 100.

FIG. 9 is a front view from a first direction of a control module of the utilization unit.

There is a recess 350 in the front surface of the control module 300, in which a user interface module 400 may be placed. At the bottom of the recess 350 there is a ninth electric connector 361 by means of which a data transmission connection may be set up between the user interface module 400 and control module 300.

The control module 300 has four fastening openings 373, 374, 375, 376 through which the control module 300 may be fixed by screws to the actuator module 100.

The control module 300 may be fixed by screws that extend through the right-hand side fastening openings 373, 374 of its front surface to the right-hand side holes 173, 174 in the front surface 103 of the actuator module 100. The control module 300 may additionally be fixed by screws that extend through the left-hand side fastening openings 375, 376 of its front surface and further through the lugs 275, 276 of the power module 200 to the to the left-hand side holes 175, 176 in the front surface 103 of the actuator module 100.

FIG. 10 is a front view from a second, opposite direction of a control module of the utilization unit.

The front part of the control module 300 there is additionally a seventh and eighth electrical connector 341, 342 by means of which the control module 300 may be connected to external devices, such as a data transfer bus or a computer.

FIG. 11 is a rear view of a control module of the utilization unit.

At the bottom of the control module 300 there is a sixth electric connector 331 which connects to the fifth electric connector 231 of the power module 200 when the control module 300 is connected to the power module 200. At the bottom of the control module 300 there is additionally a fourth electric connector 343 which connects to the third electric connector 143 of the actuator module 100 when the control module 300 is connected to the power module 200 and actuator module 100.

FIG. 12 shows a user interface module.

The user interface module 400 may comprise a joint portion which sets in the recess 350 in the control module 300. The remaining portion of the user interface module may set against the front surface of the control module 300. The user interface module 400 may cover the front surface of the control module 300. There is a ninth electric connector 361 in the recess 350 of the control module 300, and there may be a complementary electric connector at the bottom of the joint portion 410 of the user interface module 400, whereby a data transfer connection can be set up between the control module 300 and user interface module 400. The user interface module 400 may thus be fixedly connected to the control module 300. A second option is to connect the user interface module 400 to the control module 300 by a cable. In the latter case, the user interface module 400 may be placed at a distance from the control module 300. The figure also shows an electric switch pack 600.

In some cases, the utilization unit 500 may also be used without the user interface module 400.

The invention and its embodiments are not restricted to the examples of the drawings, but the invention may vary within the scope of protection defined in the claims.

The invention claimed is:

1. A modular electrical switch device, comprising:

at least one electric switch module comprising an enclosure having two opposite side panels, a rotatable blade contact being supported within the enclosure on a roll, the roll being rotatably supported by its ends in openings in the side panels of the enclosure, an actuator module comprising a frame with a first side wall, a second opposite side wall, a front wall, and an opposite rear wall, the second side wall seating against a side panel of the enclosure of the electric switch module, the actuator module further comprising actuators and a power transmission apparatus being connected to the roll in order to operate the rotatable blade contact, a power module seating against the first side wall of the actuator module, the power module comprising power supply means for supplying power to the actuators of the actuator module, a control module seating against the front wall of the actuator module, the control module comprising control means for controlling the power module, and data transfer means, complementary electric connectors providing an electrical connection between the power module and the actuator module, further complementary electric connectors providing an electric connection between the control module and the actuator module, and still further complementary electrical connectors providing an electrical connection between the control module and the power module, complementary mechanical guiding means providing a mechanical connection between the power module and the actuator module and screws providing a mechanical connection between the control module and the actuator module, wherein the power module and the control module are both separately replaceable in the modular electrical switch device.

2. The modular electrical switch device of claim 1, wherein the power module comprises a rectifier circuit configured to control a solenoid of the actuator module.

3. The modular electrical switch device of claim 1, further comprising a user interface module being connectable to the control module directly or by means of a cable.

* * * * *